CRYSTAL MOUNTING STRUCTURE WITH DAMPING MEANS

Filed Dec. 31, 1957

INVENTOR
BERTRAM C. HILL, JR.
BY
Curtis, Morris & Safford
ATTORNEYS

United States Patent Office 2,965,773 Patented Dec. 20, 1960

2,965,773

CRYSTAL MOUNTING STRUCTURE WITH DAMPING MEANS

Bertram C. Hill, Jr., Carlisle, Pa., assignor to Hill Electronic Engineering and Manufacturing Co., Inc., Mechanicsburg, Pa., a corporation of Texas Filed Dec. 31, 1957, Ser. No. 706,430

3 Claims. (Cl. 310—9.4)

This invention relates to an improved mounting structure for a piezo-electric crystal.

An object of this invention is to provide a crystal mounting and supporting structure which is protected against vibrations caused externally by violent acceleration and deceleration, such as may be encountered in aircraft or missles for example.

Another object is to provide a mounting structure immune to vibrations but which nonetheless permits the crystal to operate efficiently.

Still another object is to provide a mounting structure of this kind which is simple and inexpensive.

These and other objects will in part be understood from and in part pointed out in the description given hereinafter.

In piezo-electric crystal units of the kind to which this invention is related, especially low frequency units, the crystal, usually a thin wafer of quartz, is supported as freely as possible so as not to interfere with its mode of vibration. To this end the quartz wafer is attached at two or more points on its surface to very flexible support wires which also serve as the electrical conductors to the crystal element. For proper operation, these wires must be flexible enough so that they do not appreciably damp the vibrations of the crystal and thereby undesirably lower its "Q." However, as the wires are made more and more flexible to achieve high Q, they become susceptible to vibrations, such as caused by the violent motion in space of the equipment in which the crystal unit is mounted, and, of course, as the amplitude of undesired vibration increases the metallurgical fatiguing effect on the wires rapidly increases. The present invention eliminates this difficulty with undesired support vibration but does so without adversely damping the desired crystal vibration. Thus, the life of the crystal unit is greatly extended without any appreciable lowering of the Q of the crystal element itself and without any other adverse effects.

In accordance with one embodiment of the present invention, the long, thin support wires for a conventional crystal are protected against excessive vibration by placing around them near their bases or fixed ends loosely fitting short flexible tubes of a suitable plastic, such as Teflon. Since the plastic sleeves are relatively flexible and are disposed partway along the length of the wires, their damping effect on the wires is sufficient to prevent fatigue failure, but they do not adversely affect free vibration of the crystal wafer attached to the free ends of the support wires. Thus these plastic sleeves give very effective protection of the support wires. They can be provided at practically no cost.

Figure 1:
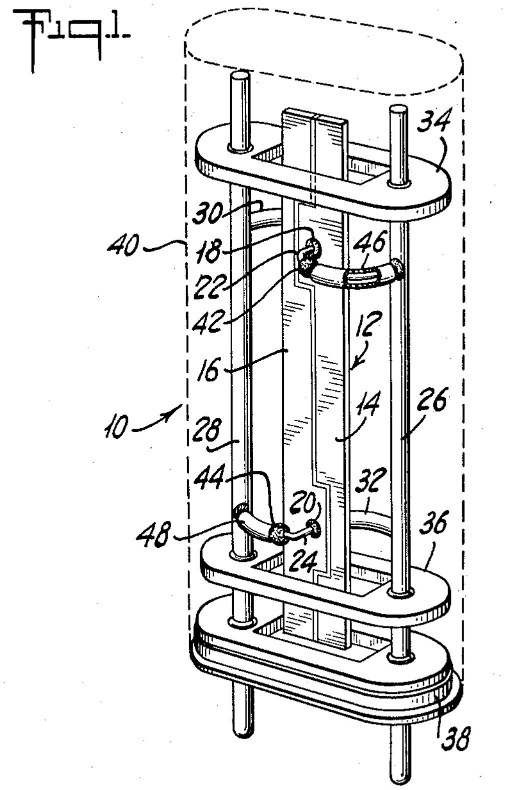
Figure 2:
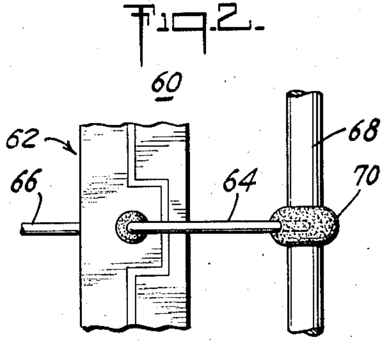

A better understanding of the invention together with a fuller appreciation of its many advantages will best be gained from a study of the following description given in connection with the accompanying drawings wherein:

Figure 1 shows a piezo-electric crystal unit embodying features of the invention; and Figure 2 shows an enlarged portion of a somewhat different crystal unit also embodying features of the invention.

The crystal unit 10 shown in Figure 1 includes a thin rectangular wafer 12 of quartz having gold plated surfaces 14 and 16 which are electrically separate and which act as electrodes in the operation of the unit, as is well known. The other side of wafer 12 is similarly plated with conductive electrodes.

Soldered to the electrodes 14 and 16 at the points 18 and 20 are the respective ends of the long thin supporting wires 22 and 24. The other ends of these wires are fixed by soldering or otherwise to the rigid supporting posts 26 and 28, respectively. These posts and the wires 22 and 24 also serve as electrical conductors to and from the crystal wafer. Supporting wires 30 and 32, similar to wires 22 and 24 are attached to the opposite face of the wafer and also fastened to posts 26 and 28. These posts are held rigid in parallel alignment by the insulating rings 34 and 36 and by the base 38, the complete assembly being enclosed in a vacuum envelope 40 indicated in dotted outline.

Midway between the ends of wires 22 and 24 (and similarly of wires 30 and 32), are fastened the lumped masses or weights 42 and 44, respectively, which are positioned at nodal points of the wires and whose function, as is well known, is to reflect vibrational waves back to the junctions 18 and 20 in phase with the vibration of wafer 12. Crystal units intended for operation at different frequencies may not have these lumped masses.

Preferably fitted relatively loosely rather than tightly around the portions of the wires between masses 42 and 44 and the posts 26 and 28 are the flexible plastic sleeves or tubes 46 and 48 (similar sleeves are slipped over corresponding portions of support wires 30 and 32). These sleeves effectively safeguard the support wires, which are relatively fragile, against mechanical fatigue and breakage due to sustained vibration. Even so, the Q of the unit remains very high and the crystal is permitted to vibrate freely.

Since these sleeves can be made of a high temperature plastic, the bases of the support wires can be soldered to posts 26 and 28 without difficulty and the unit assembled virtually as cheaply and as easily as one without these sleeves.

Figure 2 shows a modified form of damping in a crystal unit 60 which may be suitable in certain instances. Here, a crystal wafer 62, substantially the same as crystal 12, is shown supported by a wire 64, similar to wire 22, and a wire 66 fastened on the opposite face of the crystal and similar to wire 30. The base of wire 64 is fixed to the conductive support post 68, the base of wire 66 being similarly fixed to a post not shown.

Surrounding the point of attachment of support wire 64 to post 68 is a globule or mound of soft plastic 70 which is adherent to the post and extends outward from it partway along wire 64. This plastic 70 provides damping of excessive vibration in the critical portion of the support wire and yet as with sleeve 46, it does not adversely affect the Q of the unit. It is to be understood of course that a globule of plastic may be provided at the base of the other support wires in unit 60.

A crystal unit which has been built and successfully tested is shown substantially to scale in Figure 1. Wafer 12 was about 5/32 inch wide by 1⅝ inches long; wires 22, 24, 30 and 32 were about number 30 gage Phosphor bronze, about ¼ inch long; sleeves 46 and 48 and the sleeves on wires 30 and 32 were Teflon tubing about ⅛ inch long and loosely fitted around their respective wires. The Q of the unit was roughly the same with or without the four Teflon sleeves. However the unit without damping sleeves failed in a matter of seconds under an acceleration of ½ G at 350 c.p.s., whereas a unit with the damping sleeves successfully withstood vibrations of 10 to 15 G indefinitely.

The above description of the invention is intended in illustration and not in limitation thereof. Various changes may occur to those skilled in the art and these may be made without departing from the spirit or scope of the invention as set forth.

I claim:

1. A vibration-resistant crystal unit of the character described comprising a piezo-electric crystal element, a rigid supporting structure including support posts, a plurality of thin and limber metal wires each attached at their base ends to said posts and connected at their other ends to respective ones of spaced points on said crystal element to support it in cantilever fashion for relatively very free vibration, a plurality of lumped weights each fixed to a respective one of said wires at a nodal point, and a plurality of soft, flexible, damping members each applied to a respective one of said wires, at least partway along it between said weight and said post, whereby said wires are protected against destructive vibration but the "Q" of said crystal element is not appreciably reduced.

2. The structure as in claim 1 wherein each of said damping members is a short thin tube or sleeve of soft plastic loosely fitted over its respective wire between said weight and post.

3. The structure as in claim 1 wherein each of said members is a globule or collar of soft plastic moulded around the base end of its respective wire and its point of attachment to said post.

References Cited in the file of this patent

UNITED STATES PATENTS

| | | |
|---|---|---|
| 2,371,613 | Fair | Mar. 20, 1945 |
| 2,392,429 | Sykes | Jan. 8, 1946 |
| 2,608,597 | Ziegler | Aug. 26, 1952 |
| 2,830,203 | Potter | Apr. 8, 1958 |